United States Patent [19]
Bernardi et al.

[11] Patent Number: 5,980,124
[45] Date of Patent: Nov. 9, 1999

[54] CAMERA TRIPOD HAVING SPEECH RECOGNITION FOR CONTROLLING A CAMERA

[75] Inventors: Bryan D. Bernardi; Chad M. Henry, both of Rochester; Thomas M. Stephany, Churchville, all of N.Y.

[73] Assignee: Eastman Kodak Company, Rochester, N.Y.

[21] Appl. No.: 09/138,487

[22] Filed: Aug. 24, 1998

[51] Int. Cl.⁶ .................................................. G03B 17/00
[52] U.S. Cl. ............................................ 396/428; 396/429
[58] Field of Search ............................... 396/24, 56–59, 396/263, 376, 419, 428, 429

[56] References Cited

U.S. PATENT DOCUMENTS

| | | |
|---|---|---|
| 4,389,109 | 6/1983 | Taniguchi et al. ........................ 396/56 |
| 4,951,079 | 8/1990 | Hoshino et al. . |
| 5,012,335 | 4/1991 | Cohodar ............................... 396/419 X |
| 5,014,079 | 5/1991 | Kakita ........................................ 396/59 |
| 5,107,288 | 4/1992 | Kakita et al. ............................. 396/24 |
| 5,463,436 | 10/1995 | Shintani et al. .......................... 396/58 |

*Primary Examiner*—Howard B. Blankenship
*Attorney, Agent, or Firm*—David M. Woods

[57] ABSTRACT

A camera tripod for receiving a camera, the camera tripod comprises: a tripod foundation for providing a structure on which the camera may be disposed; a voice receiving mechanism disposed on said tripod foundation for receiving vocal instructions; a speech recognition system disposed in the foundation for recognizing the vocal instructions, and for initiating signals to the camera for implementation of the received vocal instruction.

9 Claims, 5 Drawing Sheets

CAMERA TRIPOD HAVING SPEECH RECOGNITION FOR CONTROLLING A CAMERA

FIELD OF THE INVENTION

This invention relates generally to the field of cameras suitable for attachment to camera tripods and, more specifically, to such camera tripods having speech recognition for controlling operations of the camera, and for controlling movement of the camera.

BACKGROUND OF THE INVENTION

When a camera with speech recognition capabilities is used by a consumer, the camera responds to user inquiries and operating commands input by vocal instructions. Such a speech recognition camera is disclosed in U.S. Pat. No. 4,951,079 by Hoshino et. al. The speech recognition capability in such a camera resides entirely within the camera and is useable only for this camera.

Although the presently known and utilized camera tripod is satisfactory, there are drawbacks. Using speech recognition to remotely control camera operations poses limitations when using certain commands. For instance, there is no advantage to remotely zoom a camera if the user cannot alter the camera's position, as in the prior art cameras. Consequently, a need exists for overcoming the above-described drawbacks.

SUMMARY OF THE INVENTION

A camera tripod for receiving a camera, the tripod comprises: a tripod foundation for providing a structure on which the camera may be disposed; voice receiving mechanism disposed on said tripod foundation for receiving vocal instructions; a speech recognition system disposed in said foundation for recognizing the vocal instructions, and for initiating signals to the camera for implementation of the received vocal instruction.

It is an advantage of the present invention to include the system for speech recognition entirely within the tripod so that the cost for such a system are in camera accessories, such as the tripod, and not in the camera. Still further, it is an advantage to have the speech recognition system in the tripod to permit using this feature with a plurality of cameras, while only having to provide speech recognition in a single tripod.

It is yet an additional advantage of the present invention to provide movement of the camera for re-composition of the camera's subject matter. For example, if a zoom command is issued to the camera, it is necessary for the camera to be repositioned based on the results of the zoom command issued.

Furthermore, it is an advantage to provide a movable graphical display so that the results of speech recognition commands can be reviewed on a real-time basis from a location remote and in front of both the camera and tripod.

DETAILED DESCRIPTION OF THE INVENTION

Figure 1:
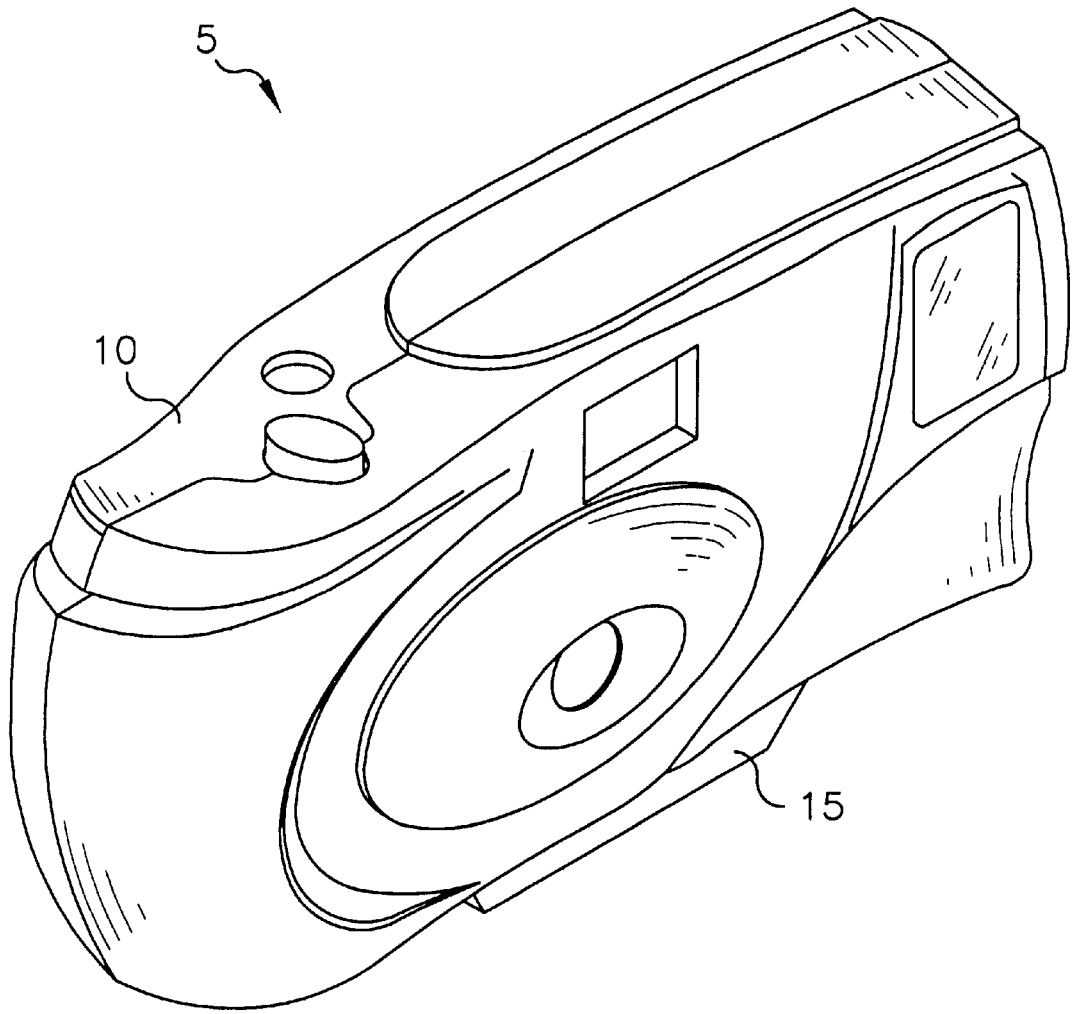
FIG. 1 is a front view of a camera of the present invention with an external connector for permitting remote control of the camera.
Figure 2:
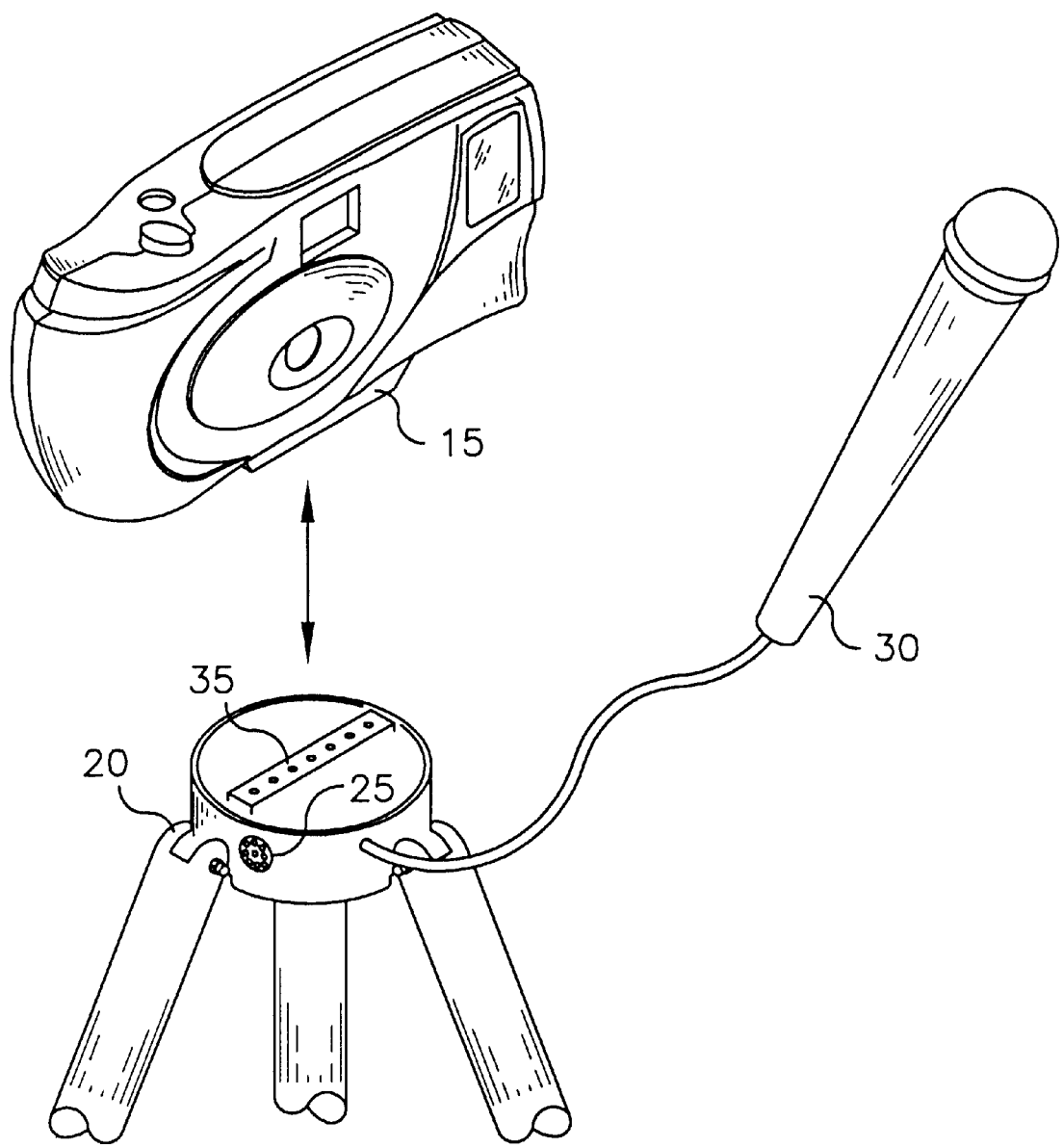
FIG. 2 is a front view of a camera of the present invention illustrating the speech-recognition tripod, and its assembly to a camera.

Referring to FIG. 1, there is illustrated a front view of a camera 5 of the present invention having a camera body 10 and an external control connector 15, through which camera functioning can be controlled from an external source, such as the speech-recognition tripod 20 shown in FIG. 2.

Referring to FIG. 2, there is illustrated the speech-recognition tripod 20 with a built-in microphone 25, and with an accessory external microphone 30 for inputting vocal commands to the tripod. The tripod 20 also includes a tripod connector 35 which mates to the external control connector 15 of the camera for permitting electrical-signal communication therebetween. Although the accessory external microphone 30 shown is connected with a wire, it is to be understood that the wire could be replaced with a wireless microphone using a wireless link, such as an infrared or radio frequency link.

Figure 3:
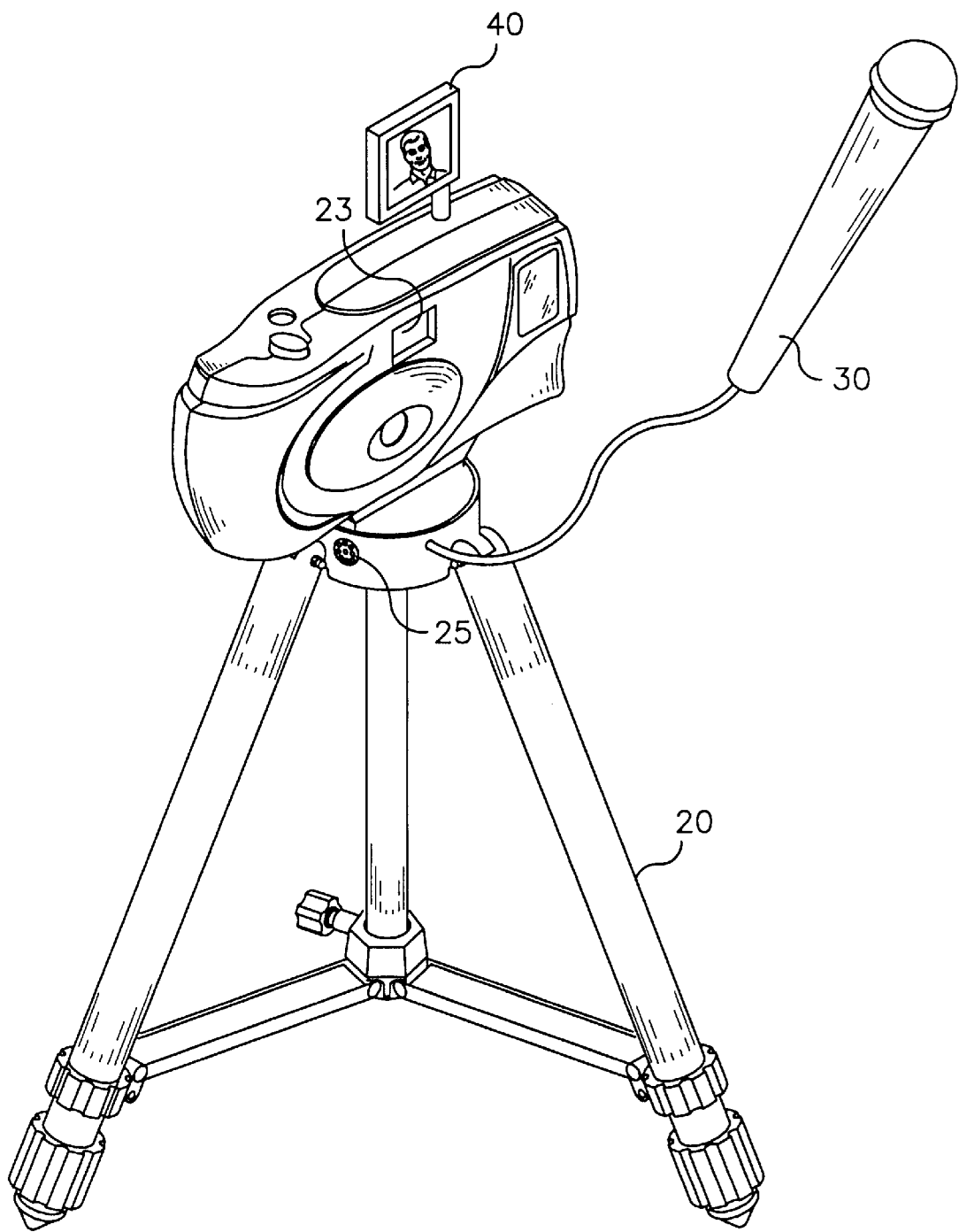
FIG. 3 is a front view of a camera of the present invention illustrating its flippable graphical display.

Referring to FIG. 3, there is illustrated the tripod 20 connected to the 5 camera with a graphical display 40 for feedback to the user as to the composition of the image as seen through the viewfinder 23. Vocal commands are input through the internal microphone 25, or alternatively through the accessory external microphone 30, and the command is recognized by the speech recognition system (described in detail hereinbelow) disposed within the tripod 20. The speech recognition system within the tripod 20 sends signals representative of the camera function to be performed as instructed by the voice commands to the camera 5 through the external camera connector 15, (FIG. 2), and tripod connector 35 (also FIG. 2).

Referring still to FIG. 3, an example of the operation of the camera and tripod is as follows. If a camera user is composing a group picture including the camera user, the user issues a vocal "zoom in" command through microphone 25. The command is recognized by speech recognition system of the tripod 20, which relays the command through the connectors 15 and 35, (both in FIG. 2). The camera then operates the zoom lens, and finally the results of the issued command are visually verified through the graphical display 40.

Figure 4:
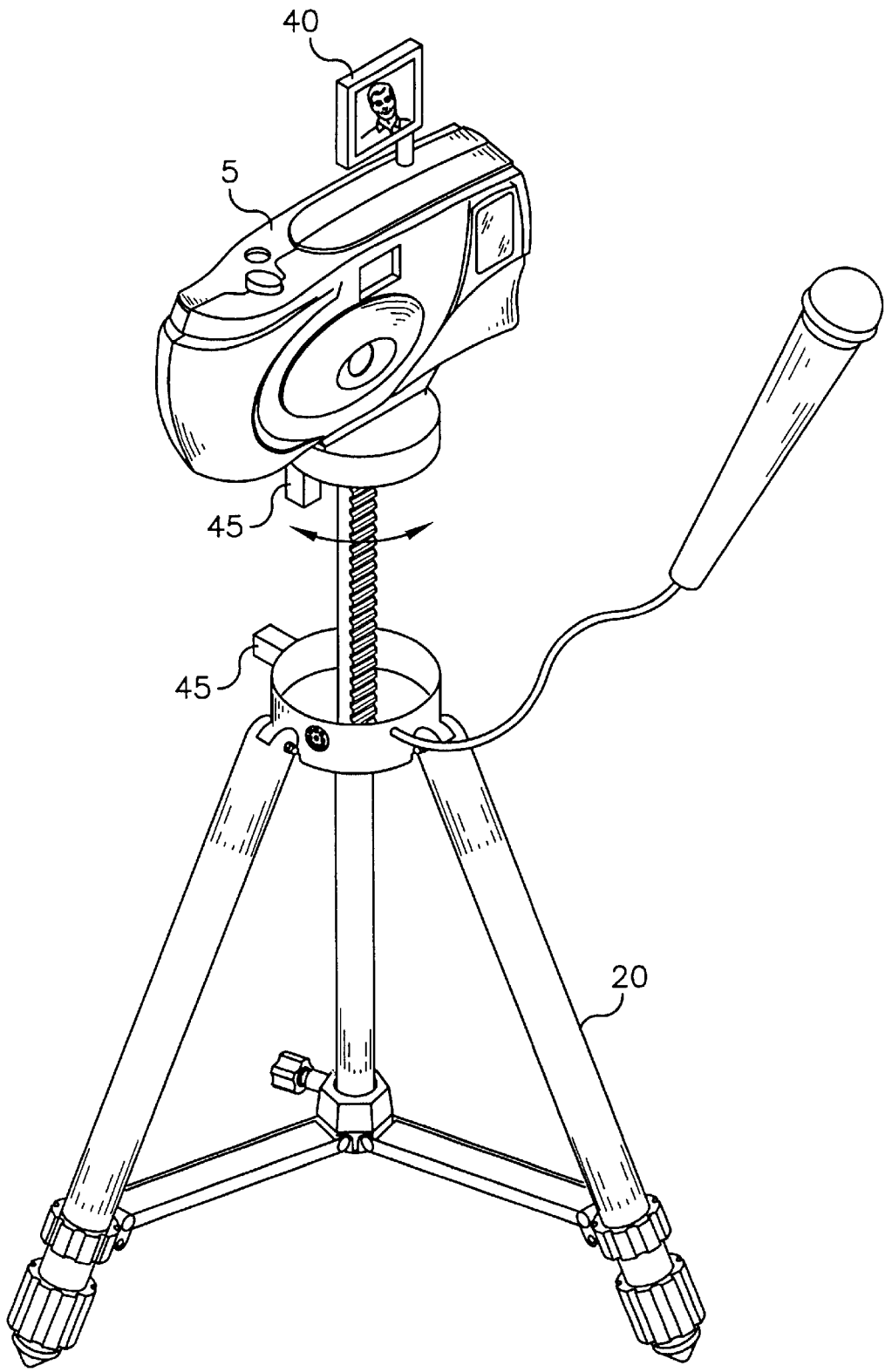
FIG. 4 is a front view of the speech-recognition tripod of the present invention showing its motor and extensions for permitting height adjustment of the connected camera.

Referring next to FIG. 4, there is shown the speech-recognition tripod 20 having movement control motors 45 for height adjustment for the camera 5. The motors 45 shown can be used to control rotation of the camera and height adjustment of the camera. It is to be understood that additional motors can also be added for alternate height adjustments or other movements.

An example of the utility of the height and rotational adjustment is as follows. For example, if a camera user is composing a group picture including the camera user and the camera user notices through graphical display 40 that a person's head is not in the picture, the user issues a "move up" command to the 10 camera through the microphone 25. The command is recognized by the speech recognition system of the tripod 20, the camera is moved upwardly by the tripod, and finally the new composition is reviewed on a real time basis through graphical display 40. The parameters of the motion of the camera could be preset in the camera, or included as part of the command word, such as "move up one foot", or "rotate 10 degrees", etc.

Figure 5:
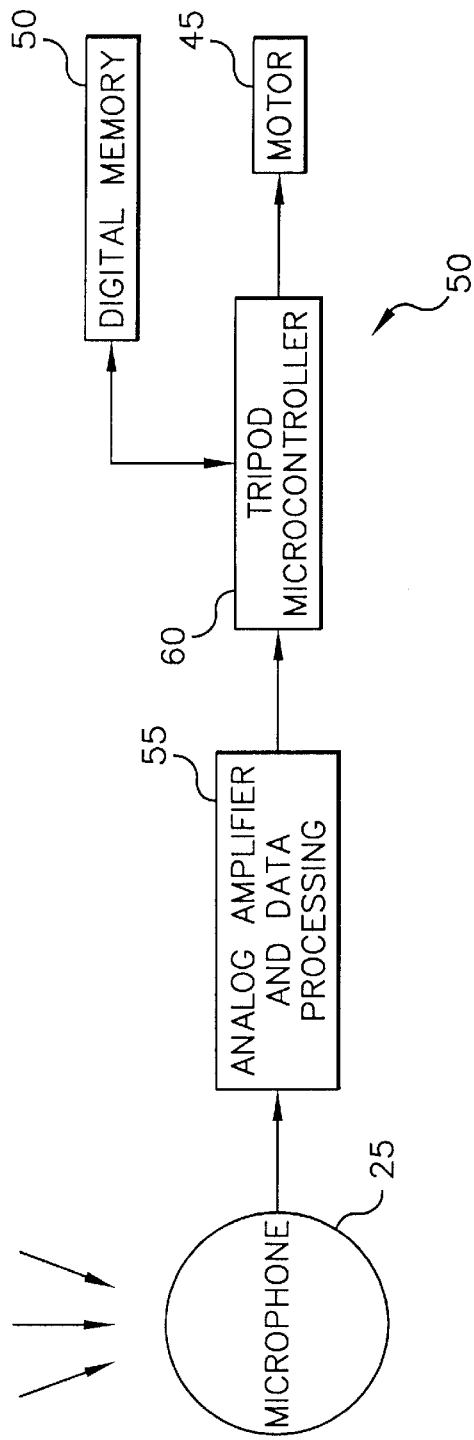
FIG. 5 is a block diagram of the speech recognition electronics in he tripod.

FIG. 5 is a block diagram of the voice recognition system 50 of the tripod 20 of the present invention. The user inputs voice commands into the microphone 25, the voice is amplified by the amplifier 55, and a tripod microcontroller 60 recognizes the voice command. A microcontroller such as a Sensory RSC-164 chip can be used for this function, and the speech recognition could operate such as is disclosed in U.S. Pat. No. 4,951,079 by Hoshino et. al. Digital memory 50 is electrically connected to the microcontroller 60 for permitting storage of a plurality of commands that the microcontroller 60 may encounter. If a motion-related command is issued a control signal is sent from the tripod microcontroller 60 to the appropriate motor 45. If a camera-related command is issued then control signals are sent by the tripod microcontroller 60 to the camera through the external control connector 15, and the mating tripod connector 35.

Figure 6:
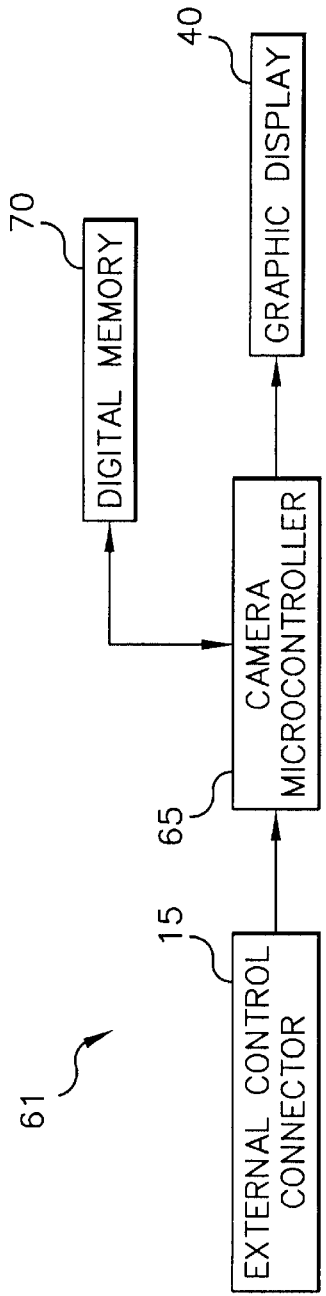
FIG. 6 is a block diagram of the electronics of the camera of the resent invention.

FIG. 6 is a block diagram 61 of the camera 5 of the present invention. Commands are received by the camera 5 through the external control connector 15, and then processed by the camera microcontroller 65. The camera microcontroller 65 will then operate the camera 5 corresponding to the command that it received. Digital memory 70 is electrically connected to the camera microcontroller 65 for permitting storage thereto by the microcontroller 65.

Although a camera with a microcontroller 65 and graphical display 40 is described as a preferred embodiment of the present invention, a camera with less sophisticated electronics could be easily implemented. The external control connector 15 could easily be wired into the corresponding camera switches directly, such that control signals from the tripod are received by the camera as if the user physically pressed the switch to be controlled. For example, a "zoom in" command would send a signal to the zoom in switch on the camera that is to the camera the same as if a user was pressing the zoom in switch.

Although the present invention has been fully described with reference to the preferred embodiments thereof, many modifications and variations thereof will be apparent to those skilled in the art without departing from the spirit and scope thereof.

PARTS LIST 5 camera
10 camera body
15 external control connector
20 speech recognition tripod
23 viewfinder
25 internal microphone
30 accessory external microphone
35 tripod connector
40 graphical display
45 movement control motors
50 voice recognition system
55 amplifier
60 tripod microcontroller
61 camera block diagram
65 camera microcontroller

What is claimed is:

1. A camera tripod for receiving a camera, the tripod comprising:

(a) a tripod foundation for providing a structure on which the camera may be disposed;

(b) a voice receiving mechanism disposed on said tripod foundation for receiving vocal instructions;

(c) a speech recognition system disposed in said foundation for recognizing the vocal instructions, and for initiating signals to the camera for implementation of the received vocal instruction.

2. The camera tripod as in claim 1, wherein said speech recognition system includes a microcontroller for directing operations according to the received vocal instructions.

3. The camera tripod as in claim 2, wherein said voice receiving mechanism includes a microphone that receives vocal instructions.

4. The camera tripod as in claim 1 further comprising a motor disposed in said foundation for permitting either or both height adjustment of the camera and/or rotational movement of the camera.

5. A camera tripod and camera combination, the combination comprising:

(a) a tripod foundation for providing a structure on which the camera is disposed;

(b) a voice receiving mechanism disposed on said tripod foundation for receiving vocal instructions;

(c) a speech recognition system disposed in said foundation for recognizing the vocal instructions, and for initiating a signal to the camera for implementation of the received vocal instruction; and (d) a microcontroller positioned in said camera that receives the initiating signals from said speech recognition system and then directs operations of the camera according to the received signal.

6. The camera and camera tripod combination as in claim 5 further comprising a moveable display attached to said camera for permitting viewing of an image to be captured by said camera.

7. The camera and camera tripod combination as in claim 5, wherein said speech recognition system includes a microcontroller for directing operations according to the received vocal instructions.

8. The camera and camera tripod combination as in claim 7, wherein said voice receiving mechanism includes a microphone that receives vocal instructions.

9. The camera and camera tripod combination as in claim 8 further comprising a motor disposed in said foundation for permitting either or both height adjustment of the camera and/or rotational movement of the camera.

* * * * *